United States Patent [19]

Nakajima

[11] Patent Number: 4,691,382
[45] Date of Patent: Sep. 1, 1987

[54] BATTERY SAVING SIGNAL GENERATING CIRCUIT

[75] Inventor: Takeshi Nakajima, Tokyo, Japan

[73] Assignee: NEC Corporation, Japan

[21] Appl. No.: 687,645

[22] Filed: Dec. 31, 1984

[30] Foreign Application Priority Data

Jan. 9, 1984 [JP] Japan ................... 59-1605

[51] Int. Cl.[4] .................. H04B 1/16; H03K 3/01; H03K 3/017; G01R 29/02
[52] U.S. Cl. ................. 455/343; 340/825.44; 307/265; 307/269; 307/296 A; 307/247.1; 328/129.1
[58] Field of Search .............. 328/61, 129.1, 109, 328/120, 58; 377/118, 119; 307/269, 272 R, 247.1, 529, 528, 527, 510, 517, 265, 296 A; 455/343; 340/311.1, 825.44; 179/2 EC

[56] References Cited

U.S. PATENT DOCUMENTS

| | | | |
|---|---|---|---|
| 3,614,632 | 10/1971 | Leibowitz | 307/247 R |
| 3,959,731 | 5/1976 | Pomerantz et al. | 328/129.1 |
| 3,989,960 | 11/1976 | Kodama | 307/247 R |
| 4,034,236 | 7/1977 | Aveneau et al. | 307/247 R |
| 4,236,114 | 11/1980 | Sasaki | 328/61 |
| 4,282,488 | 8/1981 | Norman et al. | 307/247 R |
| 4,330,751 | 5/1982 | Swain | 307/265 |
| 4,523,332 | 6/1985 | Mori | 340/825.44 |

Primary Examiner—Stanley D. Miller
Assistant Examiner—Trong Quang Phan
Attorney, Agent, or Firm—Laff, Whitesel, Conte & Saret

[57] ABSTRACT

A battery saving signal generating circuit for saving energy of a battery assembled in a paging receiver. The signal generating circuit comprises a first circuit including a frequency divider operative to produce a first timing signal for determination of a time duration of each time slot pulse, a second circuit including a frequency divider operable independent of the first circuit to produce a second timing signals for determination of an occurrence interval of each time slot pulse. The signal generating circuit further comprises a third circuit responsive to the first and second timing signals to produce a time slot pulse signal. With this signal generating circuit, it is possible to independently and desirably select a time duration TW of the BSS time slot and a timing interval TD of the time slot occurrence, resulting in improvement in adaptability to paging receivers where different preamble signal lengths are required.

8 Claims, 6 Drawing Figures (a) TIME SLOT (b) PREAMBLE SIGNAL

BATTERY SAVING SIGNAL GENERATING CIRCUIT

BACKGROUND OF THE INVENTION

The present invention relates to a battery saving signal generating circuit, and more particularly to a signal generator suitable for a battery saving system for saving energy of a battery assembled in a paging receiver, e.g., a pocket bell.

Paging receivers such as pocket bells ordinarily use a small battery as a power source. Since the current capacity of the battery used is limited to a specified value, the battery must be exchanged with a new one each time that its energy is exhausted. In such paging receivers, it is required to save current consumption as far as possible in order to reduce the troublesome battery exchange. For this purpose, e.g., a Battery Saving System (which will be called "BSS" hereinafter) has been employed.

In conventional paging receivers adapted to receive a calling signal which is carried by a radio carrier wave and transmitted from a transmitter base station, wasteful current consumption is suppressed by making use of the above-mentioned BSS when the calling signal is not being transmitted, i.e., when the receiver is in a waiting condition. Namely, as seen from a time chart shown in FIG. 1, the power supply of the receiver is turned on only during time slots $TW_1$ produced at predetermined time intervals $TD_1$ and turned off for a time except for the time slot. Further, when a calling signal S is desired to be transmitted from the transmitter base station, a preamble signal P as shown at section (b) in FIG. 2 is transmitted as a signal which precedes the calling signal S. Accordingly, the receiver receives and detects the preamble signal within a time slot $TW_2$ as shown at (a) in FIG. 2, so that the BSS condition can be released to turn on power supply for a time period $TW_2'$, thereby ensuring reception of the subsequent calling signal.

Conventionally, since, in the BSS bit rate and signal length TP, TS of each of the preamble signal P and the calling signal S are constant, it is sufficient that the time width $TW_2$ of the BSS time slot and its occurrence time interval $TD_2$ are constant. For this reason, the time width $TW_2$ and the occurrence time interval $TD_2$ can be determined by the common use of a single frequency divider circuit.

Recently, however, in proportion to an increase in the number of paging subscribers in the paging receiver system, the frequency of transmission of calling signals increases per unit of time. Accordingly, it has been required to shorten the bit rate and the signal length TP of the preamble signal P as far as possible and to narrow the occurrence time interval of the BSS time slot. As stated above, in the conventional BSS, the time width of the BSS time slot and its occurrence time interval have been determined by the common single frequency divider circuit. For this reason, the drawbacks with such a conventional BSS is that since there is a limitation upon the determination of the time width of the BSS time slot and the occurrence time interval thereof, it is impossible to independently select them, resulting in an impairment of the adaptability to the above-mentioned presently available paging system using preamble signals of different lengths.

SUMMARY OF THE INVENTION

With the above in view, an object of the present invention is to eliminate the drawbacks encountered in the conventional battery saving system employed in the paging receiver.

Another object of the present invention is to provide a battery saving system capable of being sufficiently adaptive for changes in the preamble signal length caused by an increase in the number of paging subscribers.

According to the present invention, there is provided a battery saving signal generating circuit for producing time slot pulses for energization of a power source assembled in a paging receiver, comprising first means for producing a first timing signal for determination of a time duration of each of the time slot pulses; second means operable independent of the first means, for producing a second timing signal for determination of an occurrence interval between adjacent time slot pulses; and third means responsive to the first and second timing signals, for producing the time slot pulses.

The first and second means may comprise a frequency divider circuit. The frequency divider circuit may comprise a plurality of flip-flops.

The second means may comprise a frequency divider circuit comprising a plurality of flip-flops and a NAND gate to which output signals from the flip-flops are inputted.

The second means may comprises a frequency divider circuit comprising a plurality of flip-flops, and a change-over switch circuit connected to respective flip-flops to selectively output signals from the flip-flops.

BRIEF DESCRIPTION OF THE DRAWINGS

The features and advantages of a battery saving signal generating circuit according to the present invention will become more apparent from the following description taken in conjunction with the accompanying drawings, in which.

DETAILED DESCRIPTION OF PREFERRED EMBODIMENTS

Preferred embodiments according to the present invention will be described with reference to the accompanying drawings.

Figure 1:
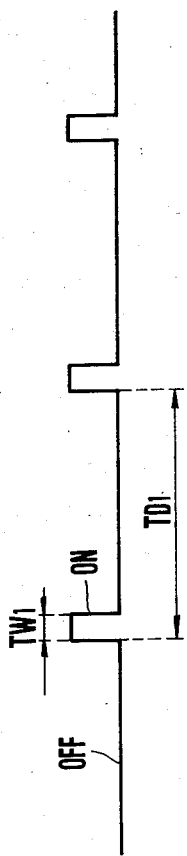
FIG. 1 is a time chart showing time slot pulses produced based on a conventional battery saving system.
Figure 2:
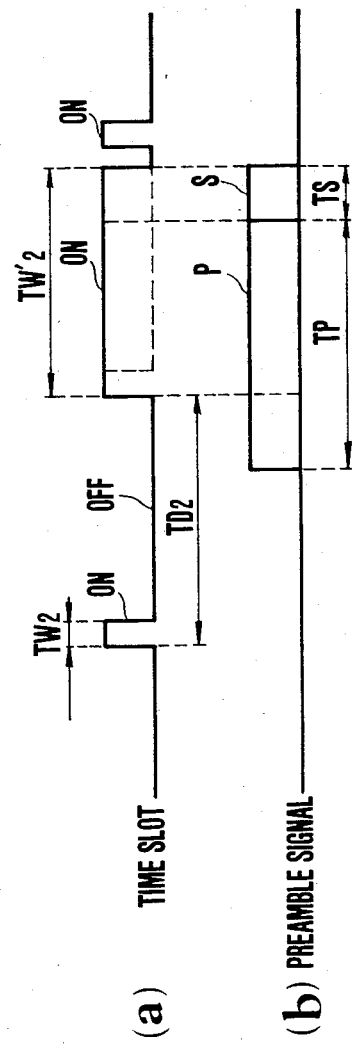
FIG. 2 is a time chart showing time slot pulses for energizing a receiver and a preamble signal produced based on the conventional battery saving system upon receipt of a calling signal.
Figure 3:
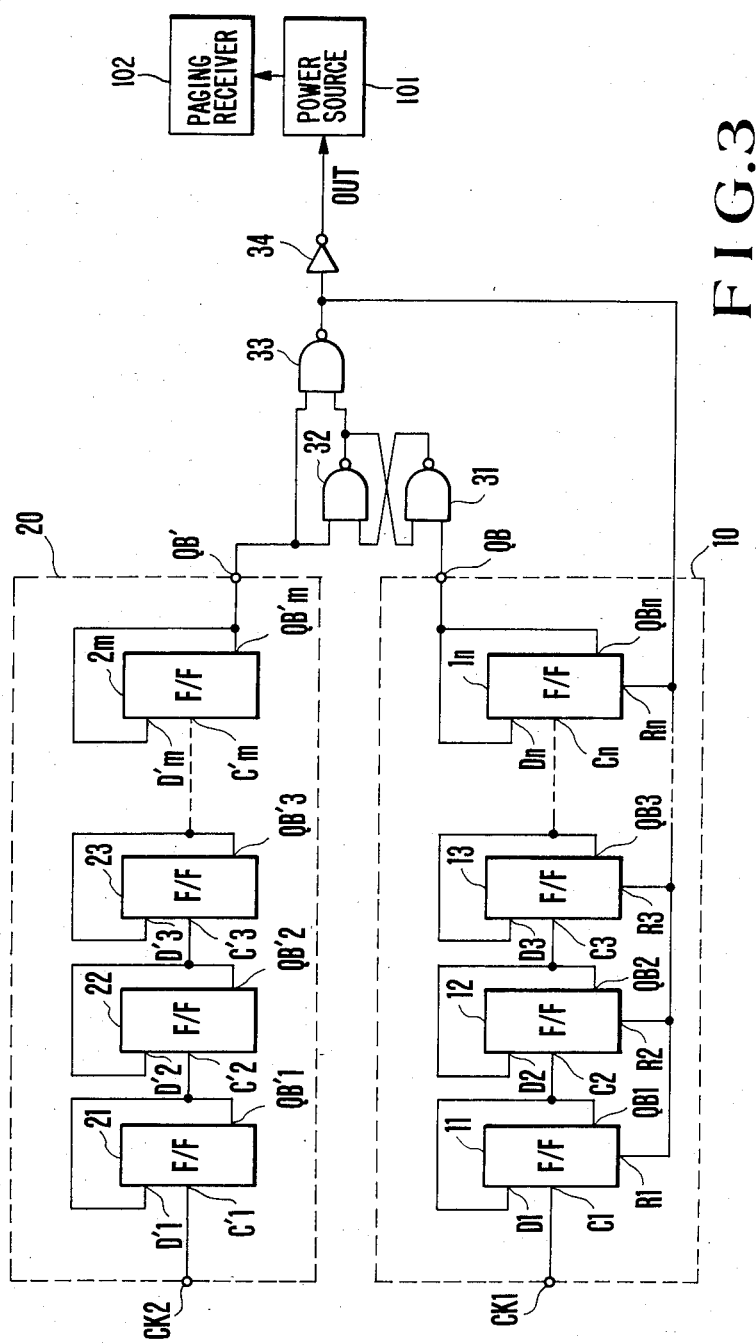
FIG. 3 is a circuit diagram showing an embodiment of a battery saving signal generator provided with two frequency divider circuits according to the present invention.

Referring to FIG. 3, there is shown an embodiment of a battery saving signal generating circuit suitable for a BSS according to the present invention wherein the circuit is operative to turn on and off a power source 101 of a paging receiver 102 in accordance with time slot pulses produced at predetermined time intervals.

The battery saving signal generating circuit comprises a first frequency divider cicuit 10 for producing a first timing signal for determination of a time duration of each time slot pulse, a second frequency divider circuit 20 operable independent of the first frequency divider circuit 10 to produce a second timing signal for determination of an occurrence interval of each time slot pulse, and a third circuit comprising a logical circuit responsive to the first and second timing signals to produce the time slot pulses.

The first frequency divider circuit 10 comprises a clock input terminal $CK_1$ for inputting a clock signal, a plurality of D-type flip-flops 11 and 14 connected in series, and an output terminal QB. D-type flip-flops 11 to 1n have data input terminals $D_1$ to $D_n$, clock input terminals $C_l$ to $C_n$, output terminals $QB_l$ and $QB_n$, and reset terminals $R_l$ to $R_n$, respectdively. The input terminal $CK_1$ is connected to the clock input terminal $C_1$ of the flip-flop 11. The output terminal $QB_1$ of the flip-flop 11 is connected to its data input terminal $D_1$ and to the clock input terminal $C_2$ of the next stage of the flip-flop 12. Further, the output terminals $QB_2$ and $QB_3$ of the flip-flops 12 and 13 are connected to their data input terminals $D_2$ and $D_3$, respectively, and are connected to the respective clock input terminals $C_3$ and $C_n$ of the next stages of the flip-flops 13 and 1n in a manner similar to the above. Further, the output terminal $QB_n$ of the flip-flop 1n is connected to its data input terminal $D_n$ and to the output terminals QB.

The second frequency divider circuit 20 comprises an input terminal $CK_2$ for inputting a clock signal, a plurality of D-type flip-flops 2l to 2m connected in series, and an output terminal QB'. Flip-flops 2l to 2m have data input terminals, $D'_l$ to $D'_{m'}$ clock input terminals $C'_l$ to $C'_{m'}$ and output terminals $QB'_l$ to $QB'_{m'}$ respectively. The second frequency divider circuit 20 has the same circuit configuration as that of the first frequency divider circuit 10 except that reset terminals are not utilized. Accordingly, the description in regard to the detailed connection of the flip-flops 21 to 2m constituting the second frequency divider circuit 20 will be omitted.

The output terminal QB of the first frequency divider circuit 10 is connected to one input teminal of a two input NAND gate 31 and the output terminal QB' of the second frequency divider circuit 20 is connected to one input terminal of a two input NAND gate 32 and to one input terminal of a two input NAND gate 33. The two input NAND gate 31 has an output terminal connected to the other input terminal of the two input NAND gate 32 whose output is connected to the other input of the two input NAND gate 31 and to the other input of the two input NAND gate 33. These two input NAND gate 31 and 32 constitute a flip-flop. Further, the two input NAND gate 33 has an output terminal connected to respective reset terminals of the flip-flops 1l to 1n and to an output terminal OUT through an inverter 34.

The battery saving signal generating circuit in this embodiment is operated in response to clock pulses inputted to the respective clock input terminals $CK_1$ and $CK_2$ of the frequency divider circuits 10 and 20. Information inputted to the respective data input terminals $D_1$ to $D_n$ and $D'_1$ to $D'_m$ of the flip-flops 11 to 1n and 21 to 2m are outputted from the output terminals $QB_1$ to $QB_n$ to $QB'_1$ to $QB'_m$ as inverting output signals $\overline{Q}$ in synchronism with the rising of the clock pulses, and respective information data are supplied to the next stages of flip-flops.

Figure 4:
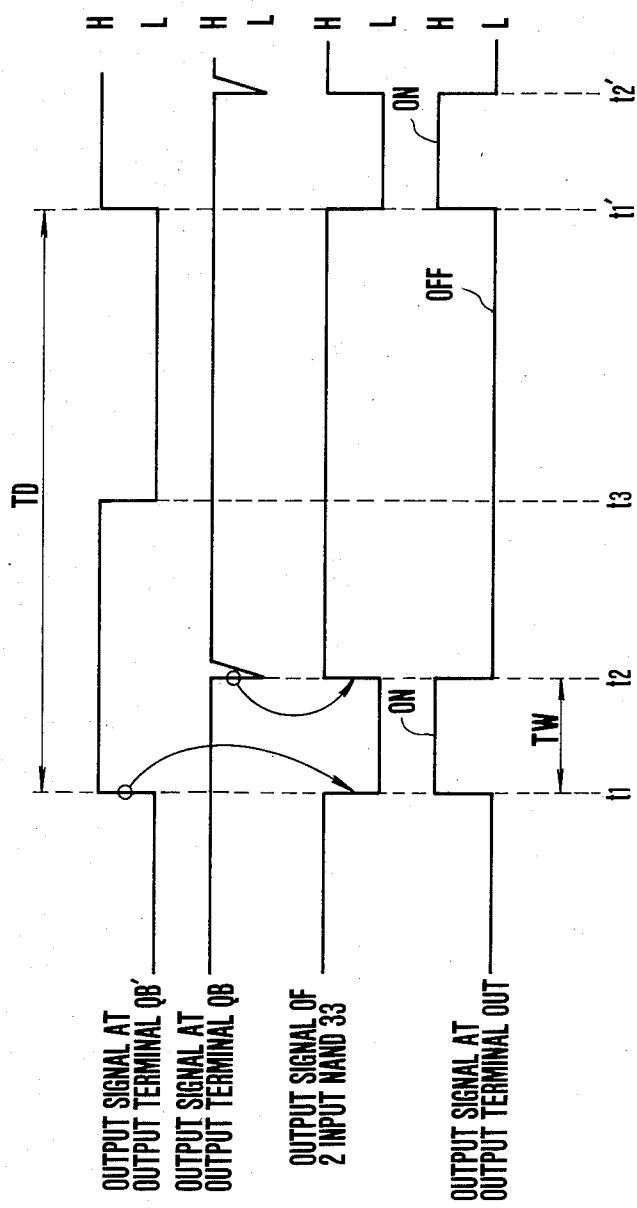
FIG. 4 shows a time chart for the circuit shown in FIG. 3.

The operation of the battery saving signal generating circuit shown in FIG. 3 will be described with reference to a time chart shown in FIG. 4.

First, when an output signal appearing on the output terminal QB' of the second frequency divider circuit 20 is in a low level, the two input NAND gate 33 produces an output signal of high level and this signal is supplied to the respective reset terminals $R_1$ to $R_n$ of the flip-flops 11 to 1n. Thus, these flip-flops 11 to 1n are all reset. At this time, the first frequency divider circuit 10 produces an output signal of high level from its output terminal QB.

Then, when an output signal appearing on the output terminal QB' of the second frequency divider circuit 20 shifts to high level at a time of $t_1$, an output signal from the two input NAND gate 33 shifts to low level. This output signal of low level is supplied to the respective reset terminals $R_1$ to $R_n$ of the flip-flops 11 to 1n, thereby clearing each flip-flop.

From this initialized condition, the first frequency divider circuit 10 starts a frequency dividing operation in accordance with the clock pulses subsequently supplied from the input terminal $CK_1$. Thus, when $t=t_2$, the first frequency divider circuit 10 produces a carry out from the output terminal QB, so that the output of high level appearing on the output terminal QB momentarily falls to low level, thereby inverting the logical state of the flip-flop constituted by two input NAND gates 31 and 32. As a result, the output signal of the two input NAND gate 33 is again returned to high level. The output of high level from the two input NAND gate 33 is supplied to the respective reset terminals $R_1$ to $R_n$ of the flip-flops 11 to 1n. Thus, the flip-flops 11 and 14 are all cleared, thereby placing the output singal appearing on the output terminal QB in a high level.

When an output signal appearing on the output terminal QB' of the second frequency divider circuit 20 shifts to low level at a time of $t_3$, the flip-flop constituted by the two input NAND gates 31 and 32 is returned to its original state. Subsequently to this, when $t=t_1'$, the output signal appearing on the output terminal QB' of the second frequency divider circuit 20 shifts to high level and the output signal from the two input NAND gate 33 shifts to low level. Further, when $t=t_2'$, the output signal appearing on the output terminal QB and the output signal from the output terminal OUT effect the same level shift as that when $t=t_2$.

Thus, an output signal for providing occurrence of time interval TD is obtained as the output signal from the second frequency divider circuit 20 and an output signal serving as time slot pulses having a time slot TW is obtained as the output signal from the output terminal OUT. It is to be noted that the second frequency divider circuit 20 is configured so as to produce an output signal having a duty ratio of 50%, i.e. so that a period of time from $t_1$ to $t_3$ of the output signal appearing on the output terminal QB' is equal to a period of time from $t_3$ to $t_1'$.

In this embodiment, as stated above, the duty factor (the ratio of high level to low level) of the output signal from the second frequency divider circuit 20 is 50% and the output signal appearing on the output terminal OUT is set to the time duration TW of the time slot with respect to the time slot occurrence interval TD. However, these time slot occurrence interval TD and the time duration TW of the BSS time slot may be desirably changed by suitably selecting each frequency of clock pulses $CK_1$ and $CK_2$ and the duty factor (values n and m of the frequency dividing ratio).

Figure 5:
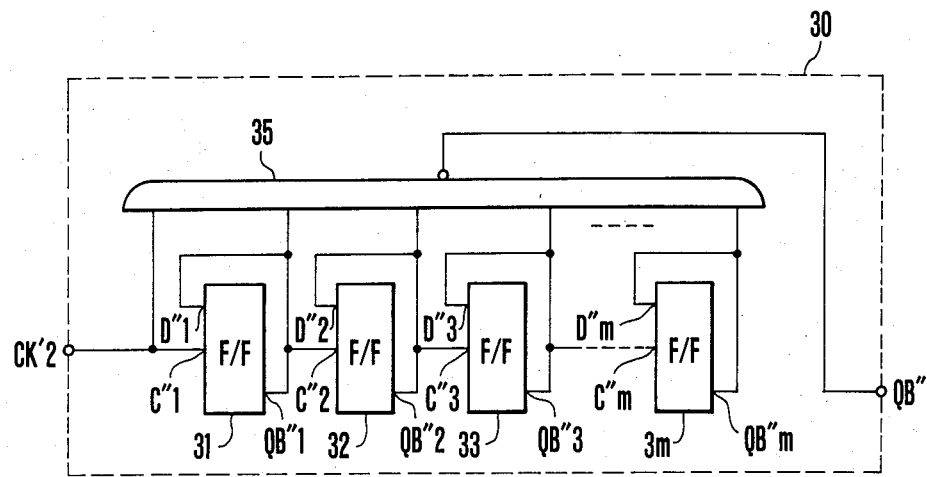
FIGS. 5 and 6 are circuit diagrams showing other embodiments of a second frequency divider shown in FIG. 3, respectively.

Referring to FIG. 5, there is shown a second frequency divider circuit 30 according to another embodiment of the invention, which is obtained by modifying the second frequency divider circuit 20 shown in FIG. 3.

The second frequency divider circuit 30 shown in FIG. 5 comprises a clock input terminal $CK'_2$, a plurality of D-type flip-flops 31 to 3m connected in series, a multi-input NAND gate 35 having inputs connected to the clock input terminal $CK'_2$ and respective output terminals $QB''_1$ to $QB''_m$ of the flip-flops 31 to 3m, and an output terminal $QB''$ connected to an output of the multi-input NAND gate 35. The multi-input NAND gate 35 is supplied, from the clock input terminalk $CK'_2$, with clock pulses identical to those inputted to the frequency divider circuit 20 shown in FIG. 3 and with output signals from reseptcive output terminals $QB''_1$ to $QB''_m$ to produce an output signal via the output terminal $QB''$ as an output of the second frequency divider circuit 30. In addition to the above-mentioned output terminals $QB''_1$ to $QB''_m$, the flip-flops 31 to 3m are further provided with data input terminals $D''_1$ to $D''_m$ and clock input terminals $C''_1$ to $C''_m$, similarly to the configuration of the second frequency divider circut 20 shown in FIG. 3.

As stated above, the second frequency divider circuit 30 is configured so that respective outputs from the output terminals $QB''_1$ to $QB''_m$ of the flip-flops 31 to 3m are inputted to the NAND gate 35 thereby to produce an output signal indicative of occurrence interval TD of the BSS time slot from the output terminal $QB''$. Thus, the second frequency divider circuit 30 can produce an output signal indicative of the occurrence interval TD wherein a period of time during which an output of low level is outputted is greatly reduced as compared to a period of time during which an output of high level is outputted, thus improving the battery saving efficiency in comparison to that of the frequency divider circuit 20 shown in FIG. 3.

Figure 6:
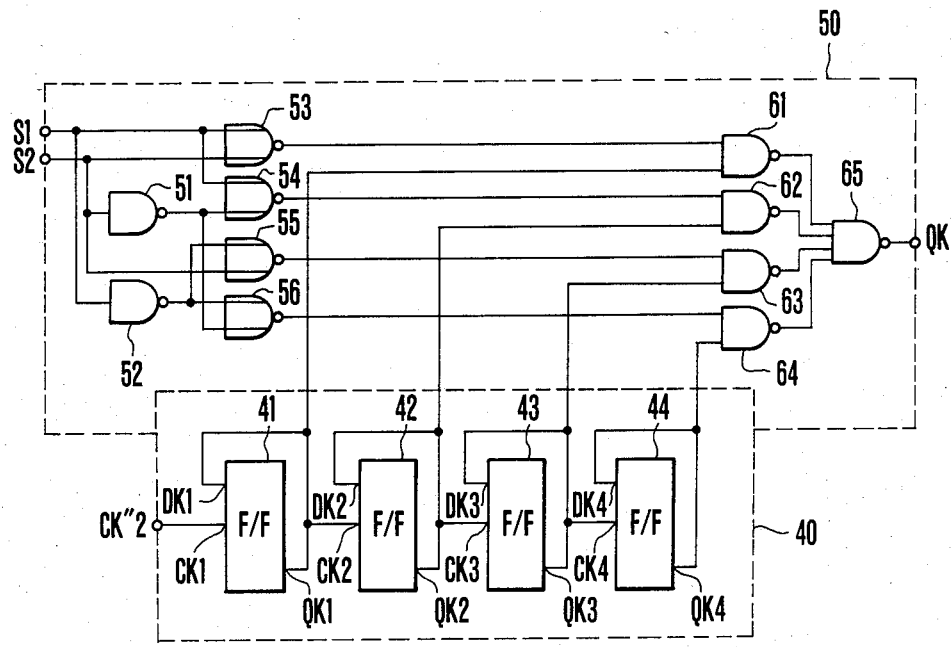

Referring to FIG. 6, there is shown a frequency divider circuit 40 according to a further embodiment of the invention, which is obtained by modifying the second frequency divider circuit 20 shown in FIG. 3.

The second frequency divider circuit 40 comprises a frequency divider section comprising a plurality of D-type flip-flops 41 to 44 connected in series, a clock input terminal $CK''_2$ connected to an input of the frequency divider section, a change-over switch circuit 50 comprising gate circuitry to be referred to later, input terminals $S_1$ and $S_2$ connected to an input of the change-over switch circuit 50, and an output terminal QK connected to an output of the change-over switch circuit 50.

More particularly, the flip-flops 41 to 44 constituting the frequency divider section are provided with clock input terminals $CK_1$ to $CK_4$, data input terminals $DK_1$ to $DK_4$ and data output terminals $QK_1$ to $QK_4$. The change-over switch circuit 50 comprises gate circuitry comprising inverters 51 and 52 connected to the input terminals $S_1$ and $S_2$, respectively, two input NOR gates 53 to 56, two input NAND gates 61 to 64 coupled to the NOR gates 53 to 56 and to the flip-flops 41 to 44, and a four input NAND gate 65 having inputs coupled to the NAND gates 61 to 64 and an output coupled to the output terminal QK through which an output signal indicating the time slot occurrence interval TD (shown in FIG. 4) is derived.

Details of the change-over switch circuit 50 will be described. The NOR gate 53 has two inputs connected to the input terminals $S_1$ and $S_2$, respectively. The NOR gate 54 has one input connected to the input terminals $S_1$ and the other input connected to the input terminal $S_2$ through the inverter 51. The NOR gate 55 has one input connected to the input terminal $S_1$ through the inverter 52 and the other input terminal connected to the input terminal $S_2$. The NOR gate 56 has one input connected to the input terminal $S_1$ through the inverter 52 and the other input connected to the output terminal $S_2$ through the inverter 51. The two input NAND gate 61 has one input connected to an output of the NOR gate 53 and the other input connected to the output terminal $QK_1$ of the flip-flop 41. The two input NAND gate 62 has one input connected to an output of the NOR gate 54 and to the output terminal $QK_2$ of the flip-flop 42. The input NAND gate 63 has one input connected to an output of the NOR gate 55 and the other input connected to the output terminal $QK_3$ of the flip-flop 43. The two input NAND gate 64 has one input connected to an output of the NOR gate 56 and the other input connected to the output terminal $QK_4$ of the flip-flop 44. The four input NAND gate 65 have inputs connected to respective outputs of NAND gates 61 to 64 and an output connected to the output terminal QK of the second frequency divider circuit 40.

The frequency divider circuit 40 thus configured operates as follows. Four logical states are available in accordance with the logical states of select signals applied to the input terminals $S_1$ and $S_2$ and they are expressed by (0, 0), (0, 1), (1, 0) and (1, 1). The notation (0, 0) means that both select signals have logical states of "0". The notation (0, 1) means that one select signal has logical state of "0" and the other select signal has logical state of "1". The notation (1, 0) means that one select signal has logical state of "1" and the other select signal has logical state of "0". The notation (1, 1) mean that both select signals have logical states of "1".

NOR gates 53, 54, 55 and 56 are correspondingly selected in accordance with logical states of the select signals expressed by (0, 0), (0, 1), (1, 0) and (1, 1). Output signals from NOR gates 53 to 56 allow two input NAND gates 61 to 64 to be opened. Thus, one of output signals from output terminals $QK_1$ to $QK_4$ of the flip-flops 41 to 44 is inputted to the NAND gate 65 through an opened NAND gate selected from NAND gates 61 to 64. Thus, an output signal is outputted from the output terminal QK. According to the data applied to the input terminals S1 and S2 (FIG. 6), the output signal of the terminal QK indicating one of four time slot intervals TD is enabled.

In this embodiment, the occurrence interval TD of the BSS time slot of the second frequnecy divider circuit 40 can be desirably determined in accordance with the select signals. Thus, this makes it possible to obtain an output signal serving as a battery saving signal in a desired ratio of the time slot occurrence interval TD to the time duration TW of the BSS time slot, thus enabling the circuit to cope with different preamble length.

As stated above, the present invention can provide battery saving signal generating circuit comprising frequency divider circuits separately provided capable of independently and desirably selecting the time duration TW of the BSS time slot and the timing interval TD of the time slot occurrence. Thus, the present invention is advantageously adapted for paging receivers of the BSS in which different preamble signal lengths are required.

What is claimed is:

1. A battery saving signal generating circuit comprising means for producing time slot pulses for energizing a power source assembled in a paging receiver;

said time slot pulse generating means comprising:

first means for producing a first timing signal for determination of a time duration of each of said time slot pulses;

second means operable independent of said first means for producing a second timing signal for determination of an occurrence interval between said adjacent time slot pulses; and third means responsive to said first and second timing signals for producing said time slot pulses;

whereby a driving power is supplied from said power source to said paging receiver when the time slot pulse is activated, and the driving power is not supplied to said paging receiver when the time slot pulse is inactivated.

2. A battery saving signal generating circuit according to claim 1, wherein said third means comprises a flip-flop responsive to said first and second timing signals, and a NAND gate responsive to said second timing signal and to an output of said flip-flop.

3. A battery saving signal generating circuit according to claim 1, wherein each of said first and second means comprises a frequency divider circuit.

4. A battery saving signal generating circuit according to claim 3, wherein said frequency divider circuit comprises a plurality of flip-flops.

5. A battery saving signal generating circuit according to claim 1, wherein said second means comprises a frequency divider circuit including a plurality of flip-flops, and a NAND gate to which respective output signals from said flip-flops are inputted.

6. A battery saving signal generating circuit according to claim 1, wherein said second means comprises a frequency circuit including a plurality of flip-flops, and a change-over switch circuit connected to said flip-flops to select an output signal of one of said flip-flops, thus adjusting said occurrence interval of each of said time slots.

7. A battery saving signal generating circuit according to any single one of the claims 3 to 6, wherein said time duration and said occurrence interval of each of said time slot pulses can be adjusted by changing at least one frequency of clock pulse signals inputted to said frequency divider circuits constituting said first and second means.

8. A battery saving signal generating circuit according to any single one of the claims 3 to 6, wherein said time duration and said occurrence interval of each of said time slot pulses can be adjusted by changing at least one value of the frequency dividing ratios of said frequency divider circuits constituting said first and second means.

* * * * *